United States Patent
Siala et al.

(10) Patent No.: US 9,467,075 B2
(45) Date of Patent: Oct. 11, 2016

(54) PROCESS FOR SWITCHING POWER SUPPLY OF ELECTRIC ENGINE AND ASSOCIATED DEVICE FOR CONTROLLING POWER SUPPLY

(71) Applicant: GE Energy Power Conversion Technology Ltd., Rugby Warwickshire (GB)

(72) Inventors: Sami Siala, Igny (FR); Prakash Battu Reddy, Anantapur (FR)

(73) Assignee: GE ENERGY POWER CONVERSION TECHNOLOGY LTD, Rugby (GB)

( * ) Notice: Subject to any disclaimer, the term of this patent is extended or adjusted under 35 U.S.C. 154(b) by 87 days.

(21) Appl. No.: 14/138,303

(22) Filed: Dec. 23, 2013

(65) Prior Publication Data

US 2014/0184132 A1   Jul. 3, 2014

(30) Foreign Application Priority Data

Dec. 27, 2012 (FR) ..................... 12 62883

(51) Int. Cl.
| | |
|---|---|
| H02P 21/00 | (2016.01) |
| H02P 1/50 | (2006.01) |
| H02P 27/06 | (2006.01) |
| H02P 1/26 | (2006.01) |
| H02P 4/00 | (2006.01) |

(52) U.S. Cl.
CPC . *H02P 1/50* (2013.01); *H02P 1/26* (2013.01); *H02P 4/00* (2013.01); *H02P 21/34* (2016.02); *H02P 27/06* (2013.01)

(58) Field of Classification Search
CPC ................. H02P 21/14; H02P 27/00
USPC .................................... 318/805, 807
See application file for complete search history.

(56) References Cited

U.S. PATENT DOCUMENTS

| | | | | |
|---|---|---|---|---|
| 4,587,474 A | * | 5/1986 | Espelage et al. ............. | 318/709 |
| 4,620,296 A | * | 10/1986 | Siemon ......................... | 363/51 |
| 5,212,438 A | * | 5/1993 | Miyazaki et al. ............. | 318/805 |
| 5,475,292 A | * | 12/1995 | Nakanishi et al. ........... | 318/705 |

FOREIGN PATENT DOCUMENTS

| | | |
|---|---|---|
| JP | S63171194 | 7/1988 |
| JP | 2001190091 | 7/2001 |
| JP | 2005168092 | 6/2005 |

OTHER PUBLICATIONS

Translated French Search Report and Written Opinion from corresponding pending French Application No. 1262883, dated Sep. 27, 2013.
Hazel "Génération électrique intégrée aux sites industriels et bâtiments commerciaux" (Integrated Electrical Generation in Industrial Sites and Commercial Buildings), published in the Schneider Electric Technical Bulletin No. 196, dated 2000.
Translation of Hazel "Génération électrique intégrée aux sites industriels et bâtiments commerciaux" (Integrated Electrical Generation in Industrial Sites and Commercial Buildings), published in the Schneider Electric Technical Bulletin No. 196, dated 2000.

* cited by examiner

*Primary Examiner* — Eduardo Colon Santana
*Assistant Examiner* — Bickey Dhakal
(74) *Attorney, Agent, or Firm* — GE Global Patent Operation; Catherine J. Toppin

(57) ABSTRACT

A method for switching the voltage supply for an alternating current electric engine between a supply from an ASD and a supply from an electrical network, the method comprises a stage for determining an ideal speed of rotation for the electric engine and for synchronizing the phase and the amplitude of the voltage delivered by the ASD with the voltage delivered by the electrical network.

16 Claims, 2 Drawing Sheets

PROCESS FOR SWITCHING POWER SUPPLY OF ELECTRIC ENGINE AND ASSOCIATED DEVICE FOR CONTROLLING POWER SUPPLY

BACKGROUND OF THE INVENTION

Embodiments of the present invention concern the process of switching the power supply of an electric engine operating with alternating current between a power supply from an adjustable speed drive (ASD) and an electrical network. Embodiments of the present invention also relate to a device for controlling the power supply of an associated electric engine.

An electric engine converts electrical energy into mechanical energy. An electric engine is composed primarily of a motor.

For certain applications, speed requirements are specific to the motor of the electric engine. This is the case particularly in the field of petroleum or gas compression. In such cases, it is desirable that the power supply to the motor can be rapidly switched from an electrical network to an adjustable speed drive or vice versa.

An adjustable speed drive is especially suitable for starting the motor. Once it has been started, the motor must be powered by the electrical network, and moreover through an ASD. This requires the voltages supplied by the ASD and the network to be synchronised. This serves to prevent surges in the voltage or the current at the moment of switching, which can be detrimental to the motor of the electric engine.

It is known that the processes for starting a motor comprise two stages: an initial step in which the motor is accelerated until it reaches a required speed, followed by a second step, in which the voltage levels supplied by the adjustable speed drive and the network are synchronised.

According to the Hazel document entitled "Génération électrique intégrée aux sites industriels et bâtiments commerciaux" (Integrated Electrical Generation in Industrial Sites and Commercial Buildings), published in the Schneider Electric Technical Bulletin No. 196, dated 2000, this synchronisation is achieved by a synchronisation device composed of a synchronisation unit and a synchro-check relay. A synchro-check relay is an apparatus that measures the amplitude and the phase difference between the voltage provided by the adjustable speed drive and the network voltage. The synchro-check can verify the conformity of the amplitude and the phase measured against a synchronisation criterion.

If the synchronisation criterion is not satisfied, the synchronisation is activated. This unit sends instructions to an adjustable speed drive controller so that the latter can correct the measured difference. The instructions are generally sent in the form of electrical impulses.

When this technique is used for starting, the acceleration stage lasts as long as 10 seconds and the synchronisation stage is active for 20 seconds. Thus, the overall process takes 30 seconds. This is long for certain ASDs that supply the motor. In certain cases, this period is long enough that the heating of the adjustable speed drive requires a cooling by water or oversizing.

There is therefore a need for a method of switching the power supply of an electric engine between a power supply by an adjustable speed drive and an electrical network, which is activated more quickly.

BRIEF DESCRIPTION OF THE INVENTION

In embodiments of the present invention, this need is satisfied by the process of switching the voltage supply of an alternating-current electric engine between a power supply from an adjustable speed drive and one from an electrical network. The process includes a stage that determines the required rotary speed for the electrical engine, as well as the synchronisation of the phase and amplitude of the voltage supplied by the adjustable speed drive with the voltage supplied by the electrical network. The synchronisation stage includes a step that measures the voltage supplied by the adjustable speed drive and the voltage supplied by the electrical network and calculates the signals representing, respectively, the amplitude difference and the phase difference between the two measured voltages. Additionally, the process includes a step that determines an ideal flow for the electric engine. The synchronisation stage also includes a step that generates a control signal at the voltage of the ASD from the ideal flow. The signal representing the difference of the calculated amplitude is then added to this.

Depending on the individual manifestations, the process comprises one or more of the following characteristics, taken separately or in any combination that is technically possible: the stage that generates a command at the voltage of the ASD is implemented while also taking into account the ideal speed of rotation, to which is added the signal representing the difference of the calculated phase; the generation stage is activated by using a vector control method; the vector control method that is used is the regulation of the amplitude of the flow and the speed; the synchronisation stage is repeated if one or both of the following conditions are not satisfied: the absolute value of the signal that represents the phase difference is less than 2 degrees and the absolute value of the signal that represents the difference of the calculated amplitude is less than 2% of the voltage supplied by the electrical network; the electrical network is connected to the electric engine through a first switch and the adjustable speed drive is connected to the electric engine through a second switch; the electric engine is initially only powered by the electrical network, and the process also includes a stage for closing the second switch if the two conditions are satisfied, controlling the ASD in order to reduce the current supplied by the electrical network to the electric engine (16) and to open the first switch; the electric engine is initially only powered by the ASD, and the process also includes a stage for closing the first switch if the two conditions are satisfied, controlling the ASD in order to increase the current supplied by the electrical network to the electric engine and to open the second switch; the process also comprises a stage for controlling the voltage of the ASD in order to increase the speed of rotation of the electric engine insofar as the speed of rotation of the electric engine and the synchronisation stage are activated as soon as the speed of rotation of the electric engine reaches 90% of the ideal rotation speed; and the synchronisation stage is activated as soon as the speed of rotation of the electric engine reaches 96% of the ideal rotation speed.

Furthermore, embodiments of the present invention also relate to a device to control the voltage supply to an alternating current electric engine, where the electric engine can be powered by a ASD and an electrical network, where the device comprises a sensor to measure the voltage supplied by the electrical network and a control device that can activate the switching process as described above.

BRIEF DESCRIPTION OF THE DRAWINGS

Other features of embodiments of the present invention will become apparent from reading the following description, which is given solely by way of example, and by referring to the following drawings.

DETAILED DESCRIPTION OF THE INVENTION

In the following text, the direction of the current is defined as being upstream-downstream.

Figure 1:
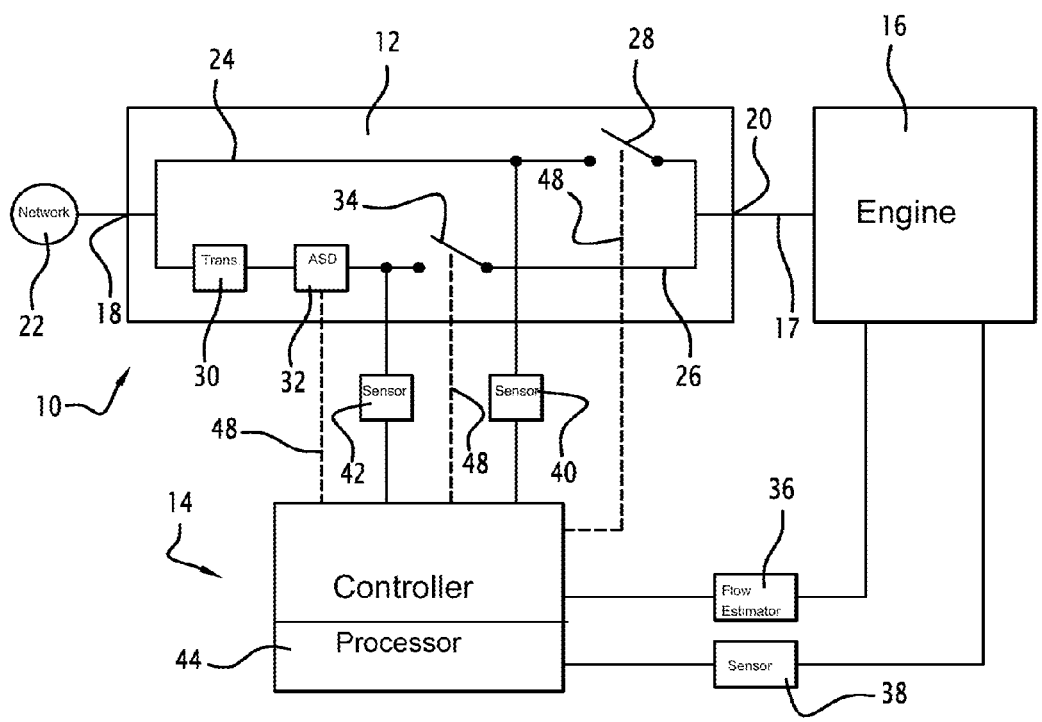
FIG. 1 shows a schematic representation of an electrical system comprising a switching device in accordance with embodiments of the present invention and an electric engine.

The electrical system 10 in FIG. 1 comprises a supply 12 of electrical voltage, a device 14 for controlling the electrical supply 12 and an alternating current engine 16. The electrical supply 12 is connected to the electrical engine 16 by a connection 17.

The electrical supply 12 comprises an input 18 and an output 20. The input is connected to the electrical network 22. The electrical network 22 is able to supply voltage and functions at a frequency known as the network frequency. In the case of FIG. 1, the voltage supplied by the electrical network 22 is a three-phase voltage.

The electrical supply 12 contains 2 circuits, 24 and 26, connecting the input 18 to the output 20.

The first circuit 24 comprises just one switch 28. This switch will be referred to below as the network switch 28. In fact, the network switch 28 has an open position, in which the input 18 and the output 20 are not connected via the first circuit 24, and a closed position, in which the input 18 and the output 20 are in direct electrical contact. In this latter case, the output 20 is connected to the electrical network 22.

The second circuit comprises, in series, a separating transformer 30, an ASD 32, and a switch 34.

The transformer 30 is designed in such a manner that it brings about an effective separation between its primary circuit or circuits on one hand and its secondary circuit or circuits on the other.

The adjustable speed drive 32 is often designated by the acronym ASD. The ASD 32 is capable of starting an alternating current electric engine 16.

The switch 34 of the second circuit 26 will be referred to below as the adjustable speed drive switch 34. In fact, the ASD switch 34 has an open position in which the ASD 32 and the output 20 of the power supply 12 are not connected via the second circuit 26 and a closed position in which the ASD 32 and the output 20 of the power supply 12 are in direct electrical contact.

The power supply 12 is thus able to operate according to three configurations.

In a configuration, the power supply 12 is able to deliver voltage through the electrical network 22 on its own. In this case, the network switch 28 is closed and the ASD switch 34 is open.

In another configuration, the power supply 12 is able to deliver voltage through the ASD 32 on its own. In this case, the network switch 28 is open and the ASD switch 34 is closed.

In another configuration, the power supply 12 is able to deliver voltage through the electrical network 22 and the ASD 32. In this case, the two switches 28 and 34 are closed.

The device 14 for controlling the electrical supply 12 comprises a flow estimator 36 for the electric engine 16, a speed measuring sensor or estimator 38 for the electric engine 16, two sensors numbered 40 and 42 for measuring the voltage, and a controller 44.

The flow estimator 36 can estimate the flow by measuring the voltage and the current levels of the electric engine 16 regardless of the nature of the power supply 12 of the electric engine 16 (through the electrical network 22 and/or through the ASD 32).

The speed measuring sensor 38 of the electric engine 16 is capable of measuring or estimating the speed of the electric engine 16.

One sensor 40 of the two voltage measuring sensors (40 and 42) is capable of measuring the voltage of the electrical network 22 upstream of the network switch 28. The other voltage measuring sensor 42 is capable of measuring the voltage between the ASD 32 and the switch of ASD 32.

The flow estimator 36 and the three measuring sensors 38, 40, and 42 are connected to the controller 44. The controller 44 comprises a processor configured to determine an ideal speed of rotation for the AC electric engine. The controller 44 also comprises a processor configured to synchronize the phase and the amplitude of the voltage delivered by the ASD with the phase and the amplitude of the voltage delivered by the electrical network. The processor is further configured to: measure the voltage delivered by the ASD and the voltage delivered by the electrical network, calculate a signal representing the difference in amplitude between the measured ASD voltage and the measured electrical network voltage, and a signal representing the difference in phase between the measured ASD voltage and the measured electrical network voltage, determine an ideal flow for the AC electric engine; and generate a voltage command signal for the voltage of the ASD on the basis of the ideal flow, and add the voltage command signal to the signal representing the difference in amplitude between the measured ASD voltage and the measured electrical network voltage.

The controller 44 is capable of controlling the voltage of the ASD 32 and of opening and closing the two switches 28 and 34. This control capacity is shown schematically in FIG. 1 by dotted lines 48.

Moreover, the controller 44 is capable of switching the power supply 12 of an electric engine 16 between a power supply by the ASD 32 and the electrical network 22.

Figures 2, 3:
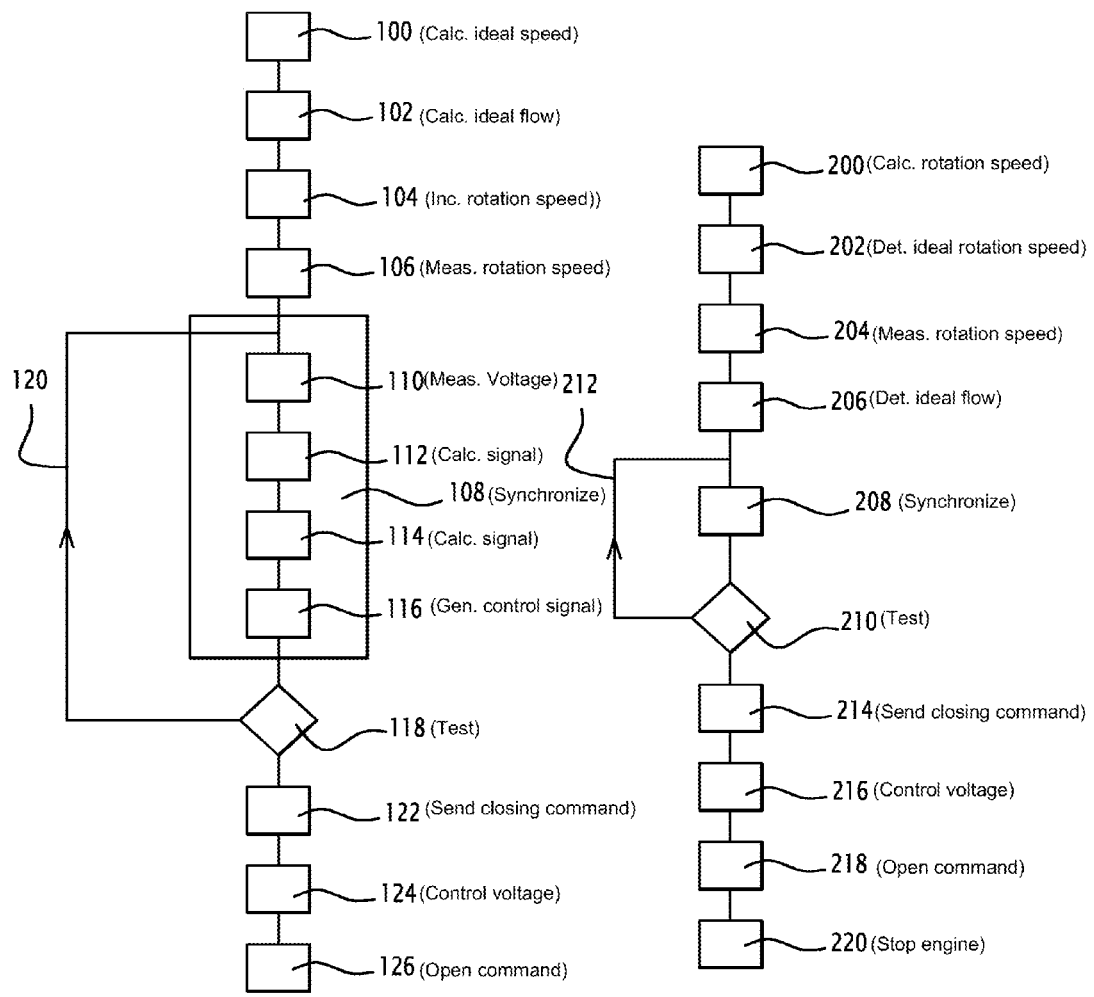
FIG. 2 shows a flowchart of an example of the activation of the switching process in accordance with embodiments of the present invention when starting the electric engine in FIG. 1.
FIG. 3 shows a flowchart of an example of the activation of the switching process in accordance with embodiments of the present invention when stopping the electric engine in FIG. 1.

The activation of the starting process of the electric engine 16 is described by referring to the flowchart in FIG. 2.

In this case, it is a question of switching the power supply 12 from a configuration where the voltage is supplied by the ASD 32 on its own (ASD switch 34 closed and network switch 28 open) to a configuration where the voltage is supplied by the electrical network on its own (ASD switch 34 open and network switch 28 closed).

The process includes a stage 100 for determining an ideal speed of rotation for an electric engine 16.

By way of example, the ideal speed of rotation is chosen as being equal to the speed of rotation associated with the operating frequency of the electrical network 22.

Alternatively, the ideal speed of rotation is chosen as being equal to the nominal speed of the electric engine 16.

The process includes a stage 102 for determining an ideal flow for the electric engine 16.

By way of example, the ideal flow is chosen as being the nominal flow of the electric engine 16.

When starting, the motor is initially stationary and the requirement is that the motor should be at the ideal speed of rotation while being supplied with voltage by the electrical network 22.

The increase in the speed of rotation of the electric engine 16 is ensured by a stage 104, which sends an appropriate voltage command to the ASD 32 through the controller 44.

The process thus includes a stage 106 for measuring the speed of rotation of the electric engine 16.

As soon as the measured speed of rotation exceeds a predetermined value for the ideal speed of rotation, a stage 108 is activated to synchronise the phase and amplitude of the voltage delivered by the ASD 32 with the voltage delivered by the electrical network 22.

The predetermined value is less than 100% in order to ensure that the synchronisation stage 108 commences before the electric engine 16 achieves its ideal speed of rotation. The synchronisation stage 108 is activated if the speed of the electric engine 16 continues to increase.

By way of example, the predetermined value is equal to 90%, more particularly to 95%, or more precisely to 96%.

The synchronisation stage 108 includes a stage 110 which measures, by the voltage sensors 40 and 42, the voltages delivered by the ASD 32 and by the electrical network 22.

The synchronisation stage 108 includes a stage 112 to calculate a signal representing the phase error between the voltages delivered by the ASD 32 and the electrical network 22.

By way of example, in the example in FIG. 2, the signal representing the phase error is the phase difference between the voltage delivered by the ASD 32 and the voltage of the electrical network 22.

The synchronisation stage 108 comprises a stage 114 to calculate a signal representing the amplitude error between the voltage delivered by the ASD 32 and the electrical network 22.

By way of example, in the example in FIG. 2, the signal representing the amplitude error is the difference in amplitude between the voltage delivered by the ASD 32 and the voltage of the electrical network 22.

The synchronisation stage 108 thus includes a stage 116 to generate a control signal for the ASD 32 on the basis of two signals calculated from the ideal speed of rotation and from the ideal flow.

Within the framework of the example in FIG. 2, the control signal is generated from two totals: one is the total of the ideal flow with the signal representing the amplitude in error, and the other is the total of the ideal speed of rotation with the signal representing the phase error.

For example, generation is set in motion by a method of vector control. The correct English term for the method is either "vector control" or "field-oriented control". The vector control method allows the speed and the flow of the electric engine 16 to be controlled by controlling the voltage applied to the ASD 32.

By way of illustration, a pulse width modulation with the acronym MLI is used. This modulation is more often known by the English term Pulse Width Modulation, or its associated acronym PWM.

The synchronisation stage is repeated in the event that two successive conditions are not satisfied. This is illustrated by the test 118 in the flowchart in FIG. 2 and by the arrow 120.

The two conditions are the synchronisation conditions with values bordering on the absolute value of the signals representing the phase and amplitude value.

For example, the absolute value of the signal representing the phase error is compared to 2 degrees. The absolute value of the signal representing the amplitude value is compared to 2% of the voltage delivered by the electrical network 22.

Once these two conditions are satisfied, the synchronisation stage 108 is completed and the process includes a stage 122, which sends a closing command to the network switch 28 by the controller 44.

Stage 122, which sends the closing command, generally takes place very soon after the electric engine 16 has reached its ideal speed of rotation. Typically, it takes place in less than 3 seconds. When the network switch 28 is closed as a result of the command sent by the controller 44 to the sending stage 122, the electric engine 16 is supplied simultaneously by the ASD 32 and the electrical network 22.

Moreover, the ASD 32 phase is served by the phase of the electrical network 22. For example, the locking is carried out by a locking phase or loop controlled by the phase (this is also referred to by the acronym PLL for "Phase-Locked Loop").

The process thus includes a stage 124 for controlling the voltage of the ASD 32 to reduce the voltage and the current delivered by the ASD 32.

If the current delivered by the ASD 32 is below a predetermined threshold value, the process includes a stage 126, in which a command is sent to the controller 44 to open the adjustable drive switch.

The predetermined threshold value is chosen in such a way that when the variator switch is opened, the ASD 32 delivers a low-amplitude current.

For example, the predetermined threshold value corresponds to 5% of the value of the current delivered by the ASD 32 before stage 124, which controls the voltage of the ASD 32 in order to reduce the level of current delivered by the ASD 32.

Alternatively, the predetermined threshold value can be equal to a fixed value. By way of illustration, this value is equal to 5% of the nominal current. The activation of the process when the electric engine 16 stops is described with reference to the flowchart in FIG. 3.

In this case, the power supply 12 has to be switched from a configuration where the voltage is supplied by the electrical network on its own (ASD switch 34 open and network switch 28 closed) to a configuration where the voltage is supplied by the ASD 32 on its own (ASD switch 34 closed and network switch 28 open).

The process includes a stage 200 for measuring the speed of rotation of the electric engine 16.

The process includes a stage 202 for determining an ideal speed of rotation for the electric engine 16. This stage 202 for determining an ideal speed of rotation is activated by choosing the measured speed of rotation as the ideal speed of rotation.

The process includes a stage 204 for measuring the speed of rotation of the electric engine 16 by the flow estimator 36.

The process includes a stage 206 for determining an ideal flow for the electric engine 16. This stage 206 for determining an ideal flow is activated by choosing the estimated flow as the ideal flow.

The process comprises a synchronisation stage 208 identical to the synchronisation stage 108 described above with reference to FIG. 2. In the same way, the synchronisation stage 208 is repeated if the two successive synchronisation conditions similar to those in the test 118 of the process described above are not satisfied. This is illustrated by the test 210 and the arrow 212.

If the two conditions are satisfied, the synchronisation stage 208 is completed and the process includes a stage 214, in which a command is sent by the controller 44 to close the ASD switch 34.

Once the ASD switch 34 is closed as a result of the command sent by the controller 44, the electric engine 16 is supplied simultaneously by the ASD 32 and the electrical network 22.

Moreover, the ASD 32 phase is served by the phase of the electrical network 22. For example, the locking is carried out by a locking phase or loop controlled by the phase (this is also referred to by the acronym PLL for "Phase-Locked Loop").

The process thus includes a stage 216 for controlling the voltage of the ASD 32 to reduce the current delivered by the electrical network 22 to the electric engine 16.

If the current delivered by the electrical network 22 to the electric engine 16 is below a predetermined threshold value, the process includes a stage 218, in which a command is sent by the controller 44 to open the network switch 28.

The predetermined threshold value is chosen in such a way that when the network switch 28 is opened, the electrical network 22 delivers a low-amplitude current.

For example, the predetermined threshold value corresponds to 5% of the value of the current delivered by the electrical network 22 before stage 126, which controls the voltage of the ASD 32 in order to reduce the level of current delivered by the electrical network 22 to the electric engine 16.

Alternatively, the predetermined threshold can be a fixed value. By way of illustration, this value is equal to 5% of the nominal current. The process thus includes a stage 220 for stopping the electric engine 16 by progressively reducing the level of voltage applied by the ASD 32. This reduction is obtained by modifying the level of voltage by the controller 44.

In the two cases cited, the speed of the electric engine 16 and the flow of the electric engine 16 are used to generate a voltage command for the ASD 32, which enables the frequency and the phase of the voltage delivered by the ASD 32 to be synchronised with the voltage delivered by the electrical network 22. The voltages generated by the controller 44 are characterised by an amplitude and an angle/frequency. The flow is directly linked to the amplitude of the voltages, while the speed directly influences the angle/frequency, which has an uncoupling effect between the actions of synchronisation: amplitude and angle of the voltage.

In each of the processes contained in FIGS. 2 and 3 there is a moment, at which after synchronising the phase and the amplitude of the voltages, the electrical network 22 and the ASD are simultaneously connected to the electric engine 16 for the purpose of supplying the latter.

The process enables sudden changes in the level of current to the electric engine 16 to be avoided during switching. Fluctuations in the voltage of the electrical network 22 are also avoided.

The process enables a synchronisation of phase and amplitude to be obtained between the voltages delivered by the ASD 32 and the electrical network 22 more rapidly than in those processes that employ a synchronisation unit and a synchro-check relay. Synchronisation is obtained within a maximum of 3 seconds and typically takes between 1 and 2 seconds. This means that the duration of the synchronisation is improved by a factor of at least 10.

A faster synchronisation means that the use of ASDs operating at a lower dimensional power that the ASDs used in combination with a synchronisation unit and a synchro-check relay can be considered. Such ASDs have the particular advantage of being less costly to manufacture.

In the case of the process that is used within the context of start-up, a faster synchronisation has the effect of reducing the heat produced by electronic components in the ASD during their operation. Benefiting from the thermal constancy of the ASD 32 and using an ASD 32, whose components do not need to be cooled with water, is now possible.

According to the proposed process, the value of the current passing through the switches 28 and 34 is close to 0 before they open. This results in very low stress levels in the switching operations and thus a longer service life for the switches 28 and 34.

The proposed process applies to all types of electric engines. The process is particularly applicable to induction motors, synchronous motors, and especially motors working with permanent magnets (also referred to as PMSM or "permanent magnet synchronous motors").

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for switching the voltage supply of an alternating current (AC) electric engine between an adjustable speed drive (ASD) and an electrical network, the method comprising:
   determining a speed of rotation for the AC electric engine; and
   synchronizing the phase and the amplitude of the voltage delivered by the ASD with the phase and the amplitude of the voltage delivered by the electrical network, wherein synchronizing comprises:
      measuring the voltage delivered by the ASD and the voltage delivered by the electrical network;
      calculating a signal representing the difference in amplitude between the measured ASD voltage and the measured electrical network voltage, and a signal representing the difference in phase between the measured ASD voltage and the measured electrical network voltage;
      determining a flow for the AC electric engine; and
      generating a voltage command signal for the voltage of the ASD on the basis of the determined flow, and adding the voltage command signal to the signal representing the difference in amplitude between the measured ASD voltage and the measured electrical network voltage.

2. The method according to claim 1, wherein generating the voltage command signal comprises generating the voltage command signal on the basis of the determined speed of rotation, and the voltage command signal is added to the signal representing the difference in phase between the measured ASD voltage and the measured electrical network voltage.

3. The method according to claim 2, further comprising repeating synchronizing if one or both of the following two conditions are not satisfied:

the absolute value of the signal representing the difference in phase is less than 2 degrees; and the absolute value of the signal representing the difference in amplitude is less than 2% of the voltage delivered by the electrical network.

4. The method according to claim 3, further comprising:

connecting the electrical network to the AC electric engine by a first switch;

connecting the ASD to the AC electric engine by a second switch, wherein the AC electric engine is initially only supplied by the electrical network;

closing the second switch if both of the two conditions are satisfied;

sending a command to the ASD to reduce the level of current supplied by the electrical network to the AC electric engine; and opening the first switch.

5. The method according to claim 3, further comprising:

linking the electrical network to the AC electric engine via a first switch;

linking the ASD to the AC electric engine via a second switch, wherein the AC electric engine is initially supplied by the ASD on its own;

closing the first switch if both of the two conditions are satisfied;

sending a command to the ASD to increase the level of current supplied by the electrical network to the AC electric engine, and opening the second switch.

6. The method according to claim 5, further comprising:

sending a command to the ASD to increase the speed of rotation of the AC electric engine;

measuring the speed of rotation of the AC electric engine; and activating synchronizing once the speed of rotation of the AC electric engine has reached a level equal to 90% of the determined speed of rotation.

7. The method according to claim 2, wherein generating a voltage command is activated by using a vector command method.

8. The method according to claim 7, wherein the vector command method is the regulation of the amplitude of the flow and the speed.

9. The method according to claim 1, wherein generating the voltage command is activated by using a vector command method.

10. The method according to claim 9, wherein the vector command method is the regulation of the amplitude of the flow and the speed.

11. The method according to claim 1, further comprising repeating synchronizing if one or both of the following two conditions are not satisfied:

the absolute value of the signal representing the difference in phase is less than 2 degrees; and the absolute value of the signal representing the difference in amplitude is less than 2% of the voltage delivered by the electrical network.

12. The method according to claim 11, further comprising:

connecting the electrical network to the AC electric engine by a first switch;

connecting the ASD to the AC electric engine by a second switch, wherein the AC electric engine is initially only supplied by the electrical network;

closing the second switch if both of the two conditions are satisfied;

sending a command to the ASD to reduce the level of current supplied by the electrical network to the AC electric engine; and opening the first switch.

13. The method according to claim 11, further comprising:

linking the electrical network to the AC electric engine via a first switch;

linking the ASD to the AC electric engine via a second switch, wherein the AC electric engine is initially supplied by the ASD on its own;

closing the first switch if both of the two conditions are satisfied;

sending a command to the ASD to increase the level of current supplied by the electrical network to the AC electric engine, and opening the second switch.

14. The method according to claim 13, further comprising:

sending a command to the ASD to increase the speed of rotation of the AC electric engine;

measuring the speed of rotation of the AC electric engine; and activating synchronizing once the speed of rotation of the AC electric engine has reached a level equal to 90% of the determined speed of rotation.

15. The method according to claim 13, further comprising activating synchronizing once the speed of rotation of the AC electric engine has reached a level equal to 96% of the determined speed of rotation.

16. A device for controlling a voltage supply to an alternating current (AC) electric engine, wherein the AC electric engine is capable of being powered by an adjustable speed drive (ASD) and an electrical network, the device comprising:

a sensor configured to measure a voltage delivered by the ASD;

a sensor configured to measure a voltage delivered by the electrical network; and a controller configured to switch the voltage supply of the AC electric engine between the ASD and the electrical network, wherein the controller comprises:

a processor configured to determine a speed of rotation for the AC electric engine; and a processor configured to synchronize the phase and the amplitude of the voltage delivered by the ASD with the phase and the amplitude of the voltage delivered by the electrical network, wherein the processor is further configured to:

measure the voltage delivered by the ASD and the voltage delivered by the electrical network;

calculate a signal representing the difference in amplitude between the measured ASD voltage and the measured electrical network voltage, and a signal representing the difference in phase between the measured ASD voltage and the measured electrical network voltage;

determine a flow for the AC electric engine; and generate a voltage command signal for the voltage of the ASD on the basis of the determined flow, and add the voltage command signal to the signal representing the difference in amplitude between the measured ASD voltage and the measured electrical network voltage.

* * * * *